United States Patent Office 2,815,312
Patented Dec. 3, 1957

2,815,312

PESTICIDAL THIOPHOSPHORIC ACID ESTERS AND METHODS OF DESTROYING INSECTS

Max Schuler, Arlesheim, Switzerland, assignor, by mesne assignments, to Saul & Co., Newark, N. J., as nominee of Fidelity Union Trust Company, executive trustee under Sandoz Trust No Drawing. Application January 16, 1956,
Serial No. 559,117

Claims priority, application Switzerland January 21, 1955

8 Claims. (Cl. 167—22)

The present invention relates to new insecticidal mono- and dithiophosphoric acid esters and to compositions containing the same. The invention relates further to the employment of the said compositions for combating pests, especially insect pests.

The new mono- and dithiophosphoric acid esters of the present invention correspond to the formula

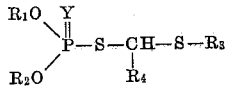
(I)

wherein $R_1$ and $R_2$ are low molecular aliphatic hydrocarbon radicals, $R_3$ is an alkyl or aralkyl radical which may be substituted, $R_4$ stands for —$COOR_5$,

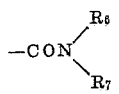

or —C≡N, each of $R_5$, $R_6$ and $R_7$ being a low molecular aliphatic hydrocarbon radical, and Y stands for O or S.

The aforesaid esters (I) can be prepared by reacting a compound of the formula

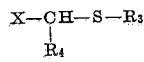
(II)

with a compound of the formula

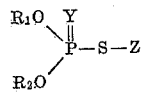
(III)

wherein $R_1$, $R_2$, $R_3$, $R_4$ and Y have the same signficances as in Formula I, X stands for a halogen atom, and Z represents a cation.

Especially suitable compounds of Formula II are the esters and dialkylamides of the alkyl- or aralkylmercaptochloroacetic acids, as well as the alkyl- or aralkylmercaptochloroacetonitriles. The alkyl esters of the alkyl- or aralkylmercaptochloroacetic acids can be prepared for example by the reaction between corresponding chloroacetic acid alkylesters and the alkali metal salts of the corresponding thioalcohols or arylalkylmercaptans, and chlorination of the resultant alkyl- or aralkylmercaptoacetic acid esters. The alkyl- and aralkylmercaptoacetic acid esters can also be obtained by reacting the alkali metal salts of thioglycolic acid esters (mercaptoacetic acid esters) with alkylating or aralkylating agents. In the same way as the esters, the dialkylamides of the alkyl- or aralkylmercaptochloroacetic acids can be prepared for example from chloroacetic acid dialkylamides and the alkali metal salts of the corresponding thioalcohols or arylalkylmercaptans, followed by chlorination of the resultant alkyl- or aralkylmercaptoacetic acid dialkylamides. The alkyl- or aralkylmercaptochloroacetonitriles can correspondingly be prepared by the reaction of chloroacetonitrile with the alkali metal salts of thioalcohols or arylalkylmercaptans and chlorination of the resultant condensation products.

Illustrative of the large number of compounds of Formula II which can be employed according to the present invention are e. g.:
Methylmercaptochloroacetic acid methylester,
Methylmercaptochloroacetic acid ethylester,
Methylmercaptochloroacetic acid n-propylester,
Methylmercaptochloroacetic acid isopropylester,
Methylmercaptochloroacetic acid butylester,
Methylmercaptochloroacetic acid isoamylester,
Ethylmercaptochloroacetic acid methylester,
Ethylmercaptochloroacetic acid ethylester,
Ethylmercaptochloroacetic acid n-propylester,
Ethylmercaptochloroacetic acid isopropylester,
Ethylmercaptochloroacetic acid butylester,
Ethylmercaptobromoacetic acid ethylester,
n-Propylmercaptochloroacetic acid methylester,
n-Propylmercaptochloroacetic acid ethylester,
n-Propylmercaptochloroacetic acid isopropylester,
n-Propylmercaptochloroacetic acid n-propylester,
Isopropylmercaptochloroacetic acid methylester,
Isopropylmercaptochloroacetic acid ethylester,
Isopropylmercaptochloroacetic acid isopropylester,
Isopropylmercaptochloroacetic acid n-propylester,
n-Butylmercaptochloroacetic acid methylester,
n-Butylmercaptochloroacetic acid ethylester,
n-Butylmercaptochloroacetic acid propylester,
Benzylmercaptochloroacetic acid ethylester,
Ethylmercaptochloroacetic acid diethylamide,
Ethylmercaptochloroacetonitrile, etc.

Particularly suitable compounds of Formula III for the preparation of thiolphosphoric acid esters of Formula I wherein Y=O are the alkali metal or ammonium salts of thiolphosphoric acid dimethylester and of thiolphosphoric acid diethylester. Particularly suitable compounds of Formula III for the preparation of the dithiophosphoric acid esters of Formula I wherein Y=S are the alkali metal or ammonium salts of dithiophosphoric acid dimethylester or dithiophosphoric acid diethylester.

In order to prepare the thiolphosphoric acid esters or the dithiophosphoric acid esters, halides of Formula II are reacted with salts of dialkylthiolphosphoric acids or of dialkyldithiophosphoric acids, preferably in a solvent such as acetone, benzene, toluene, chlorobenzene, water, etc. The reaction is advantageously carried out at temperatures between 40° and 150° C.

The thus-prepared compounds are, at ordinary temperatures (about 20° to about 30° C.), more or less colored oils, many of which can be distilled under reduced pressure without decomposition. They are stable in aqueous suspension and most of them are soluble in oils as well as in organic solvents. They are especially useful for combating pests, especially insect pests.

In combating pests, e. g. insect pests, the mono- and dithiophosphoric acid esters of Formula I are advantageously admixed with emulsifiers, e. g. with liquid polyglycolethers obtained from high molecular alcohols, mercaptans or alkylphenols by the adding on of ethylene oxide, after which they are emulsified in water and the obtained emulsion applied, e. g. by atomization, to the surfaces to be treated. If desired, there may be included in the said mixture suitable organic solvents such as mono- or poly-alcohols, aromatic hydrocarbons, mineral oils, etc., as solubilizing agents. If it be desired to convert the said mixture into the form of a water-suspendable pulverulent product, solid carriers such as talcum, kaolin, kieselguhr, bentonite, etc., may be incorporated therewith. The so-obtained liquid or powdered products are preferably emulsified or dispersed before use, it being advantageous that the resultant emulsion or suspension contain from 0.01% to about 0.3% by weight of the said esters.

The mono- or dithiophosphoric acid esters can, however, also be worked up into the form of a dust or strewing agent, in the absence of added emulsifiers, by admixture with suitable carriers such as talcum, kaolin, kieselguhr, bentonite, etc., or with a mixture of such carriers, the incorporation of an adhesive agent being sometimes advantageous.

The following examples set forth, by way of illustration, presently-preferred representative embodiments of the invention. In these examples, the relationship between parts by weight and parts by volume is the same as that between grams and milliliters. Percentages are by weight; temperatures are in degrees centigrade.

*Example 1*

40.6 parts by weight of ammonium diethyldithiophosphate and 36.5 parts by weight of ethylmercaptochloroacetic acid ethylester are stirred together for 10 hours at 100° in 300 parts by volume of toluene. After cooling, the reaction mixture is then washed with the threefold volume of water, the toluene layer separated and dried, and the compound of the formula

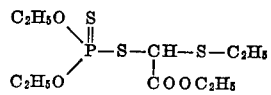

obtained therefrom by distillation. It is a practically colorless oil which boils at 124–125° under a pressure of 0.02 mm. Hg; $n_D^{20}=1.5208$.

*Example 2*

32.8 parts by weight of sodium dimethylthiophosphate and 45.4 parts by weight of ethylmercaptobromoacetic acid ethylester are introduced into 250 parts by volume of acetone. The mixture is boiled under reflux for one hour while stirring, then 300 parts by volume of water are added, and the mixture shaken out with ether. The ethereal extract is dried and the ether evaporated off. The readily volatile components are removed from the crude product by distilling them off at a bath temperature of 110° under a pressure of 0.1 mm. Hg. There remains behind a clear, somewhat orange-colored compound of the formula

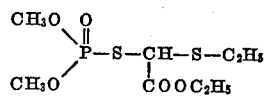

It has an index of refraction $n_D^{20}=1.5053$.

*Example 3*

38.4 parts by weight of sodium dimethylthiolphosphate and 39.3 parts by weight of n-propylmercaptochloroacetic acid ethylester are introduced into 300 parts by volume of acetone and caused to react, after the manner set forth in Example 2. From the so-obtained crude product, there is obtained by distillation the compound of the formula

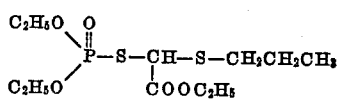

which is a substantially colorless oil which boils at 126–127° under a pressure of 0.1 mm. Hg; $n_D^{20}=1.4811$.

*Example 4*

41.6 parts of sodium diethyldithiophosphate and 42.1 parts by weight of ethylmercaptochloroacetic acid butylester are reacted together in 300 parts by volume of xylene, after the manner described in Example 1. There is obtained, by distillation from the crude product, the compound of the formula

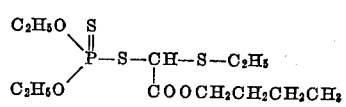

which is a weakly orange-yellow oil which boils at 135–136° under a pressure of 0.1 mm. Hg; $n_D^{20}=1.5201$.

*Example 5*

35 parts by weight of ammonium dimethyldithiophosphate and 41.9 parts by weight of ethylmercaptochloroacetic acid diethylamide are introduced into 250 parts by volume of acetone, and the mixture boiled under reflux for one hour with stirring. After cooling the mixture, 500 parts by volume of water are added thereto and the whole is then shaken out with ether. The ether solution is dried, the ether distilled off, and the readily volatile components removed from the crude product by distillation at a bath temperature of 110° under a pressure of 0.1 mm. Hg. There is obtained a reddish brown oil which consists essentially of the compound of the formula

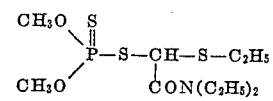

*Example 6*

40.6 parts by weight of ammonium diethyldithiophosphate and 27.1 parts by weight of ethylmercaptochloroacetonitrile are reacted, after the manner set forth in Example 5. By distillation, there is obtained the compound of the formula

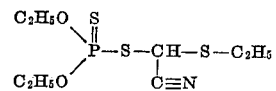

which has the following properties: weak reddish oil, boiling point=117–119° under a pressure of 0.3 mm. Hg.

*Example 7*

40.6 parts by weight of ammonium diethyldithiophosphate and 39.3 parts by weight of ethylmercaptochloroacetic acid isopropylester are caused to react with each other in 300 parts by volume of toluene, after the manner set forth in Example 1. Upon distillation, there is obtained the compound of the formula

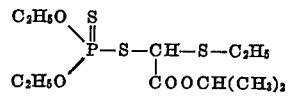

which is a practically colorless oil which boils at 132° under a pressure of 0.04 mm. Hg.

In the same manner as described in the foregoing examples, additional compounds of Formula I

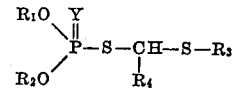

can be prepared by the reaction between equimolecular quantities of a compound of Formula II

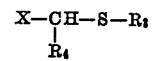

and a compound of Formula III

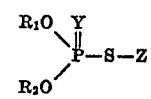

A representative number of such additional compounds are set forth in the following tabular summary. In those cases where the obtained esters can be purified by distillation, the boiling point is set forth. Those esters which are not distillable without decomposition are obtained in the form of the crude products which nevertheless consist almost entirely of the corresponding ester. The $R_1$, $R_2$, $R_3$, $R_4$, Y and Z indicated in the tabular summary correspond to the respective variables set forth in the foregoing Formulae I, II and III. It will be understood that many more compounds of Formula I can be prepared.

| Example No. | R₁, R₂ | Y | Z | R₃ | R₄ | Boiling point; or nature of crude product |
|---|---|---|---|---|---|---|
| 8 | CH₃ | S | NH₄ | —CH₃ | —COOCH₃ | reddish oil. |
| 9 | CH₃ | S | NH₄ | —CH₃ | —COOCH(CH₃)₂ | Do. |
| 10 | CH₃ | S | NH₄ | —CH₃ | —COOCH₂CH₂CH₂CH₃ | Do. |
| 11 | CH₃ | S | NH₄ | —C₂H₅ | —COOCH₃ | Do. |
| 12 | CH₃ | S | Na | —C₂H₅ | —COOC₂H₅ | orange oil. |
| 13 | CH₃ | S | NH₄ | —C₂H₅ | —COOCH₂CH₂CH₃ | bright reddish oil. |
| 14 | CH₃ | S | NH₄ | —CH₂CH₂CH₃ | —COOC₂H₅ | reddish oil. |
| 15 | CH₃ | S | NH₄ | —CH₂CH₂CH₃ | —COOCH(CH₃)₂ | bright reddish oil. |
| 16 | CH₃ | S | NH₄ | —CH(CH₃)₂ | —COOCH₃ | reddish oil. |
| 17 | CH₃ | S | NH₄ | —CH(CH₃)₂ | —COOCH(CH₃)₂ | Do. |
| 18 | CH₃ | S | NH₄ | —C₂H₅ | —C≡N | reddish brown oil. |
| 19 | CH₃ | O | Na | —C₂H₅ | —COOCH₃ | reddish oil. |
| 20 | CH₃ | O | Na | —C₂H₅ | —COOCH(CH₃)₂ | Do. |
| 21 | C₂H₅ | S | NH₄ | —CH₃ | —COOCH₃ | B. P.₀.₁₅ 134–135°. |
| 22 | C₂H₅ | S | NH₄ | —CH₃ | —COOCH(CH₃)₂ | B. P.₀.₁ 130–132°. |
| 23 | C₂H₅ | S | Na | —C₂H₅ | —COOCH₃ | B. P.₀.₀₃ 124–125°. |
| 24 | C₂H₅ | S | Na | —C₂H₅ | —COOCH₂CH₂CH₃ | B. P.₀.₀₉ 130–131°. |
| 25 | C₂H₅ | S | K | —C₂H₅ | —COO.iso-C₅H₁₁ | B. P.₀.₀₅ 124–125°. |
| 26 | C₂H₅ | S | Na | —CH₂CH₂CH₃ | —COOC₂H₅ | B. P.₀.₀₆ 130–132°. |
| 27 | C₂H₅ | S | NH₄ | —CH₂CH₂CH₃ | —COOCH(CH₃)₂ | B. P.₀.₁ 131–132°. |
| 28 | C₂H₅ | S | NH₄ | —n-C₄H₉ | —COOCH₃ | B. P.₀.₀₉ 134–136°. |
| 29 | C₂H₅ | S | K | —CH(CH₃)₂ | —COOCH₃ | B. P.₀.₀₃ 134°. |
| 30 | C₂H₅ | O | Na | —C₂H₅ | —COOCH₃ | B. P.₀.₀₅ 120°. |
| 31 | C₂H₅ | O | Na | —C₂H₅ | —COOC₂H₅ | B. P.₀.₁ 125–127°. |
| 32 | C₂H₅ | O | Na | CH₂CH₂CH₃ | —COOCH(CH₃)₂ | B. P.₀.₀₃ 127–128°. |
| 33 | C₂H₅ | O | Na | —CH₂— 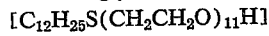 | —COOC₂H₅ | orange reddish oil. |
| 34 | C₂H₅ | O | Na | —C₂H₅ | —CON(C₄H₉)₂ | brownish oil. |
| 35 | C₂H₅ | O | Na | —C₂H₅ | C≡N | B. P.₀.₂ 116–118°. |

*Example 36*

50 parts by weight of the ester obtained according to Example 1 are admixed with 50 parts by weight of isooctylphenylheptaglycolether, a clear solution being obtained. An aqueous emulsion of this product, which emulsion contains 0.05% of the said ester, is sprayed onto young apple trees infested with aphids. In a few hours, all aphids are dead.

A similar result is obtained if, in the preceding paragraph, the ester according to Example 1, is replaced by the same quantity of ester according to Example 11, 16 or 26.

*Example 37*

50 parts by weight of the ester obtained according to Example 12 are admixed with 40 parts by weight of laurylhexaglycolether and 10 parts by weight of xylene. An aqueous emulsion of this product containing 0.1% of the ester is sprayed onto aphids-infected potted plants (cinneraria, asters, chrysanthemums). In a few hours, all the aphids are dead.

The ester according to Example 12 may, with like results, be replaced by the same quantity of the ester according to Example 9, 10, 20, 34 or 35.

*Example 38*

50 parts by weight of the ester obtained according to Example 8 are admixed with 40 parts by weight of tert. dodecylmercaptanundecaglycolether

[C₁₂H₂₅S(CH₂CH₂O)₁₁H]

and 10 parts by weight of a mineral oil with the following properties: boiling point 320–405°, 20–23% sulfonatable components, and spec. weight (20°) 0.90–0.92. There is obtained a clear solution which forms a good emulsion in water. Such an aqueous emulsion, containing 0.05% of the said ester, kills aphids in a few hours.

The ester according to Example 8, may, with like results, be replaced by the same quantitity of the ester according to Example 7, 22 or 23.

*Example 39*

20 parts by weight of the ester obtained according to Example 3 are admixed with 20 parts by weight of laurylhexaglycolether and 60 parts by weight of xylene, whereby a product is obtained which gives a good emulsion in water. Such an emulsion, containing 0.1% of the said ester, when sprayed onto aphids, kills them all in a few hours.

The ester according to Example 3 may, with like result, be replaced by the same quantity of the ester according to Example 4, 6, 21 or 25.

*Example 40*

By admixing 20 parts by weight of the ester obtained according to Example 19 with 20 parts by weight of diisohexyl-heptylphenylhexaglycolether and with 60 parts by weight of a mixture consisting of 45 parts by weight of propyleneglycol and 15 parts by weight of butoxyethoxyethanol, a product is obtained which is excellently emulsifiable in water. An aqueous emulsion of this mixture, containing 0.05% of the said ester, kills aphids in a few hours.

The ester according to Example 19 may, with like result, be replaced by the same quantity of the ester according to Example 1, 12 or 31.

*Example 41*

A pulverulent agent which forms a good suspension in water is obtained by thoroughly admixing 15 parts by weight of the ester obtained according to Example 2 with 3 parts by weight of tert. dodecylmercaptanundecaglycolether, 7 parts by weight of powdered silica gel and 75 parts by weight of kaolin. An aqueous suspension prepared from this mixture and containing 0.05% of the said ester kills aphids sprayed therewith in several hours.

In the mixture according to the preceding paragraph, the 15 parts by weight of the ester according to Example 2 may be replaced, with like result, by 15 parts by weight of the ester according to Example 3 or Example 30.

*Example 42*

2 parts by weight of the ester obtained according to Example 5 are admixed with 98 parts by weight of talcum and the mixture is thoroughly ground in a ball mill. The product constitutes a dusting agent which kills periplaneta (cockroaches) dusted therewith.

In lieu of the ester of Example 5, use may also be made of the same quantity of the ester according to Example 17, 27, 32 or 33, an effective dusting agent for periplaneta being obtained in each case.

*Example 43*

50 parts by weight of the ester obtained according to Example 13 are admixed with 40 parts by weight of laurylhexaglycolether and 10 parts by weight of xylene, a clear solution being thus obtained which is readily emulsifiable in water. Such an aqueous emulsion, which contains 0.15% of the ester, kills aphids sprayed therewith in several hours. A similar result is obtained if the said ester is replaced by the same quantity of the ester of Example 15, 18, 24 or 29.

*Example 44*

5 parts by weight of the ester obtained according to Example 7 are admixed with 18 parts by weight of laurylhexaglycolether, 3 parts by weight of butoxyethoxyethanol, 70 parts of a mineral oil as described in Example 38, and 4 parts by weight of a technical alcohol mixture consisting predominantly of n-octanol. A clear solution, which is readily emulsifiable with water, is obtained. An aqueous emulsion of the said solution, which emulsion contains 0.75-2% of the latter, is excellently suited for combatting winter-surviving stages of insects, such as aphids (Aphidae), scale insects (Coccidae), winter moth (*Cheimatobia brumata*), and psyllids (Psyllidae).

In the preceding paragraph, the named ester may, with equally good results, be replaced by the same quantity of ester according to Example 1, 14, 24, 26 or 27.

Having thus disclosed the invention, what is claimed is:

1. A pest control composition comprising a thiophosphoric acid ester which corresponds to the formula

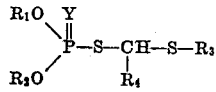

wherein each of $R_1$ and $R_2$ represents a low molecular aliphatic hydrocarbon group, $R_3$ represents a member selected from the groups consisting of lower alkyl and lower aralkyl, $R_4$ represents a member selected from the group consisting of —COO.lower alkyl, —CON(lower alkyl)$_2$ and C≡N, and Y stands for a member selected from the group consisting of O and S, and a pesticide adjuvant as carrier therefor.

2. A pest control composition according to claim 1, wherein said adjuvant is an emulsifying agent.

3. A pest control composition according to claim 1, wherein said adjuvant comprises a polyglycolether as emulsifying agent.

4. A pest control composition according to claim 1, wherein said adjuvant is a finely divided, solid, water-insoluble inorganic pesticide adjuvant.

5. A thiophosphoric acid ester which corresponds to the formula

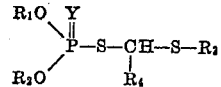

wherein each of $R_1$ and $R_2$ represents a low molecular aliphatic hydrocarbon group, $R_3$ represents a member selected from the groups consisting of lower alkyl and lower aralkyl, $R_4$ represents a member selected from the group consisting of —COO.lower alkyl, —CON(lower alkyl)$_2$ and C≡N, and Y stands for a member selected from the group consisting of O and S.

6. A thiophosphoric acid ester which corresponds to the formula

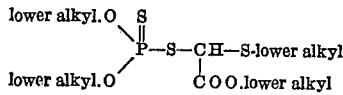

7. The method of controlling insect pests which comprises applying to the insects a composition according to claim 1.

8. The method of controlling insect pests which comprises applying to their habitat a composition according to claim 1.

References Cited in the file of this patent

UNITED STATES PATENTS 2,565,921    Hook _____ Aug. 28, 1951